(12) United States Patent
Harris et al.

(10) Patent No.: US 7,230,637 B2
(45) Date of Patent: Jun. 12, 2007

(54) TORSION OSCILLATOR CURRENT CONTROL DRIVER

(75) Inventors: Steven Jeffrey Harris, Lexington, KY (US); Martin Christopher Klement, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 370 days.

(21) Appl. No.: 11/002,342

(22) Filed: Dec. 2, 2004

(65) Prior Publication Data
US 2006/0119700 A1    Jun. 8, 2006

(51) Int. Cl.
H01S 3/00    (2006.01)
B41J 2/47    (2006.01)

(52) U.S. Cl. .................... 347/237; 347/247
(58) Field of Classification Search ................ 347/237, 347/247; 372/38.02
See application file for complete search history.

(56) References Cited

U.S. PATENT DOCUMENTS

| 4,264,809 A | 4/1981 | Fearnside |
| 4,317,611 A | 3/1982 | Petersen |
| 4,344,677 A | 8/1982 | Stuermer et al. |
| 4,630,223 A | 12/1986 | Schoon |
| 4,686,363 A | 8/1987 | Schoon |
| 4,797,749 A | 1/1989 | Paulsen |
| 4,800,271 A | 1/1989 | Blais |
| 5,477,330 A | 12/1995 | Dorr |
| 6,304,359 B1 | 10/2001 | Gadhok |
| 6,838,661 B2 * | 1/2005 | Klement .................. 250/234 |
| 6,870,560 B2 * | 3/2005 | Bush et al. .............. 347/259 |
| 2003/0021497 A1 | 1/2003 | Kandori et al. |

* cited by examiner

Primary Examiner—Huan Tran
(74) Attorney, Agent, or Firm—Luedeka, Neely & Graham, PC (57) ABSTRACT

A system for driving a torsion oscillator based on frequency, amplitude and offset control signals includes a pulse width modulator subsystem configured to generate a stream of repetitive pulse signals which encodes the frequency, amplitude and offset control signals, a low pass filter for filtering the stream of repetitive pulse signals to provide a filtered output, and a driver circuit for driving the torsion oscillator based on the filtered output.

25 Claims, 9 Drawing Sheets

TORSION OSCILLATOR CURRENT CONTROL DRIVER

BACKGROUND OF THE INVENTION

The invention relates generally to torsion oscillators, also termed resonant galvanometers, as well as to bidirectional scanning and imaging apparatuses including such torsion oscillators, and, more particularly, to systems for driving torsion oscillators.

Torsion oscillators which include an oscillating mirror may be employed in bidirectional scanning and imaging devices, such as laser printers, as an alternative to a rotating polygonal mirror.

As disclosed in Klement U.S. patent application Ser. No. 10/093,754, filed Mar. 8, 2002, and published as No. US 2003/0169055 A1 on Sep. 11, 2003, titled "Torsion Oscillator Stabilization," a torsion oscillator having an oscillating mirrored surface may be employed as a laser scanner when a laser is directed at the oscillating mirrored surface. A scan path which corresponds to motion of the oscillating mirror is thereby defined. The mirror angle changes sinusoidally with respect to time at a certain amount of sweep or scan angle (termed amplitude), at a certain repetition rate (termed frequency) and with a potential lack of symmetry with respect to the using apparatus (termed median offset or simply offset). Amplitude, frequency and offset are stabilized and controlled for useful operation, employing feedback from sensors which sense the light beam at predetermined positions in the scan path. More particularly, amplitude, frequency and offset are controlled such that the time interval during which the scanned beam traverses an imaging window is kept constant, and the offset is kept constant.

SUMMARY OF THE INVENTION

In one aspect, the invention is embodied in a system for driving an oscillator based on frequency and amplitude control signals. The system includes a modulator subsystem configured to generate a stream of repetitive pulse signals which encodes the frequency and amplitude control signals. A low pass filter filters the stream of repetitive pulse signals to provide a filtered output. A driver circuit drives the torsion oscillator based on the filtered output. In accordance with another aspect of the invention, a system is provided for driving an oscillator based on frequency, amplitude and offset control signals. The system includes a modulator subsystem configured to generate a stream of repetitive pulse signals which encodes the frequency, amplitude and offset control signals. A low pass filter filters the stream of repetitive pulse signals to provide a filtered output. A driver circuit drives the torsion oscillator based on the filtered output.

In another aspect, the invention is embodied in a system for driving a torsion oscillator based on frequency, amplitude and offset control signals. The system includes a pulse width modulator subsystem configured to generate a stream of repetitive pulse signals alternating between two controlled duty cycles at an alternating frequency corresponding to the frequency control signal. One of the two controlled duty cycles is controlled based on the amplitude control signal plus a design nominal duty cycle value, and summed with the offset control signal. The other of the controlled duty cycles is controlled based on the amplitude control signal minus the design nominal duty cycle value, and summed with the offset control signal. A low pass filter has an input connected to receive the stream of repetitive pulse signals from the pulse width modulator subsystem, as well as a low pass filter output. A driver circuit is connected for driving a torsion oscillator based on the low pass filter output.

In yet another aspect, the invention is embodied in a bidirectional imaging apparatus including a light source for generating a light beam, and a torsion oscillator having a reflective surface disposed in the path of the light beam for oscillating and scanning the light beam through a scan path including an imaging window occupying a portion of the scan path. The light beam is scanned across the imaging window in a forward direction and a reverse direction. Sensors are provided for sensing the position of the light beam in the scan path, and feedback controllers generate frequency, amplitude and offset control signals based on signals from the sensors. The apparatus additionally includes a pulse width modulator subsystem configured to generate a stream of repetitive pulse signals alternating between two controlled duty cycles at an alternating frequency corresponding to the frequency control signal. One of the two controlled duty cycles is controlled based on the amplitude control signal plus a design nominal duty cycle value, and summed with the offset control signal. The other of the controlled duty cycles is controlled based on the amplitude control signal minus the design nominal duty cycle value, and summed with the offset control signal. A low pass filter has an input connected to receive the stream of repetitive pulse signals from the pulse width modulator subsystem, as well as a low pass filter output. The driver circuit is connected for driving a torsion oscillator based on the low pass filter output.

DETAILED DESCRIPTION

Elements of the embodiment disclosed herein are disclosed in the above-referenced Klement U.S. patent application Ser. No. 10/093,754, filed Mar. 8, 2002, published as No. US 2003/0169055 A1 on Sep. 11, 2003; and in Bush et al U.S. patent application Ser. No. 10/329,084; the entire disclosures of which are hereby expressly incorporated by reference.

Figure 1:
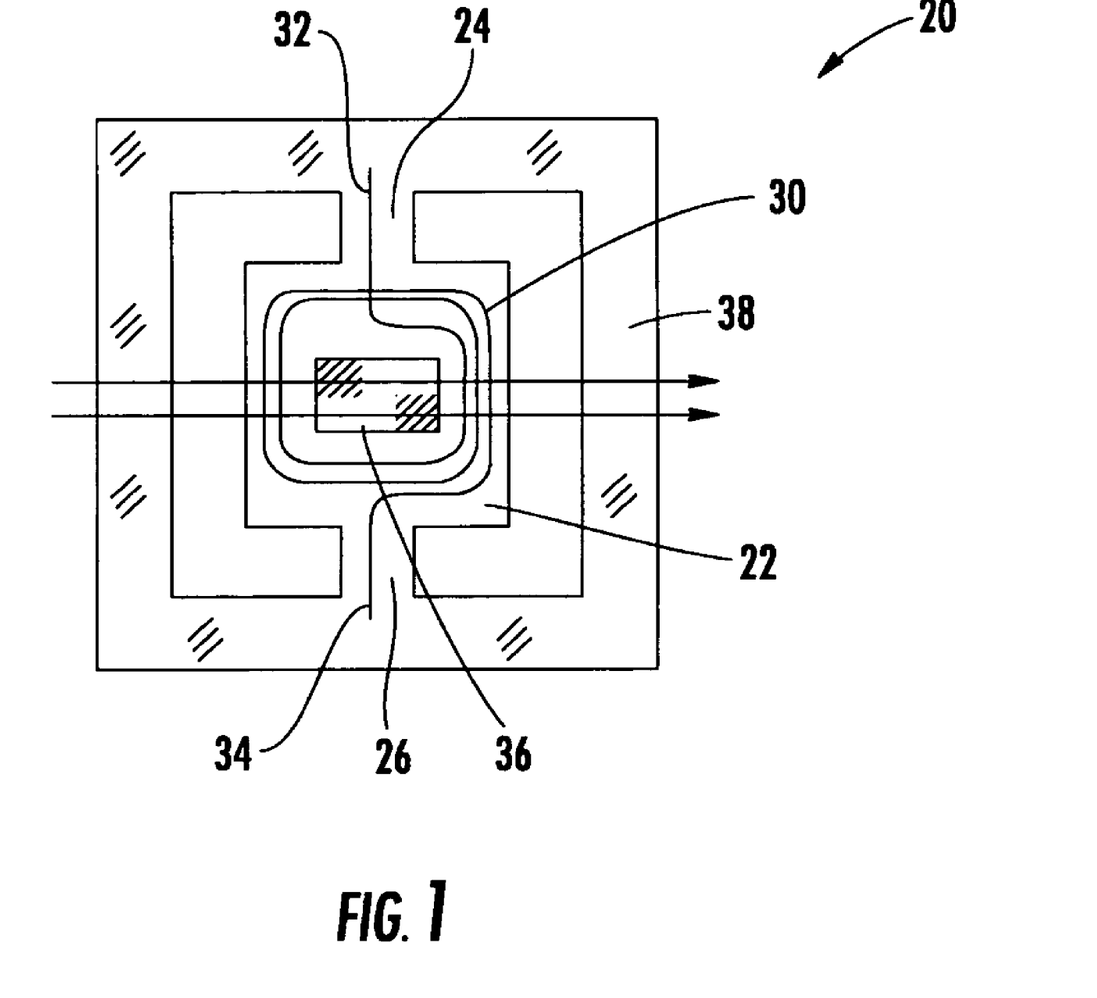
FIG. 1 is a schematic plan view of a representative torsion oscillator.

Referring to first to FIG. 1, a representative torsion oscillator 20, which also may be referred to as a resonant galvanometer 20, includes a central generally rectangular plate 22 suspended by two extensions 24 and 26 of the material of the plate 22. The extensions 24 and 26 also are integral with a surrounding frame 28. The plate 22 is generally symmetrical about its axis of oscillation, which axis is defined by the extensions 24 and 26. Typically, the plate 22, extensions 24 and 26, and frame 28 are cut or etched from a single silicon wafer. A coil 30 of an electrically conductive material and having terminals 32 and 34, and a reflective surface 36 such as a mirror 36 are placed on the central plate 22. Since silicon is itself about 60% reflective, the mirror 36 may simply be a smooth or polished surface region on the central plate 22. Typically, however, the mirror 36 is a deposited layer of material, such as gold, on a smooth silicon substrate. The central plate 22 and coil 30 are within a magnetic field, represented by arrows 38, produced by permanent magnets (not shown). Accordingly, when a current is driven through the coil 30, a force is exerted on the coil 30, which force is transferred to the plate 22. This force causes movement of the plate 22 about the axis defined by the extensions 24 and 26, which twist with reverse inherent torsion. Thus, rotational movement is created when electrical drive power (voltage and current) is applied to the coil 30. The spring rate of the extensions 24 and 26 and the mass of the central plate 22 comprise a rotational spring-mass system with a specific mechanical resonant frequency, resulting in an oscillating mirror 36. As one example, the mechanical resonant frequency is approximately 3.2 kHz. Typical maximum mechanical deflection is ±23°. In very general terms, the construction of the torsion oscillator 20 is such that motion of the central plate 20 and mirror 36 is controlled by the characteristics of the electrical drive power supplied to the torsion oscillator, in particular, to the coil 30 through connections to the terminals 32 and 34.

Figure 2:
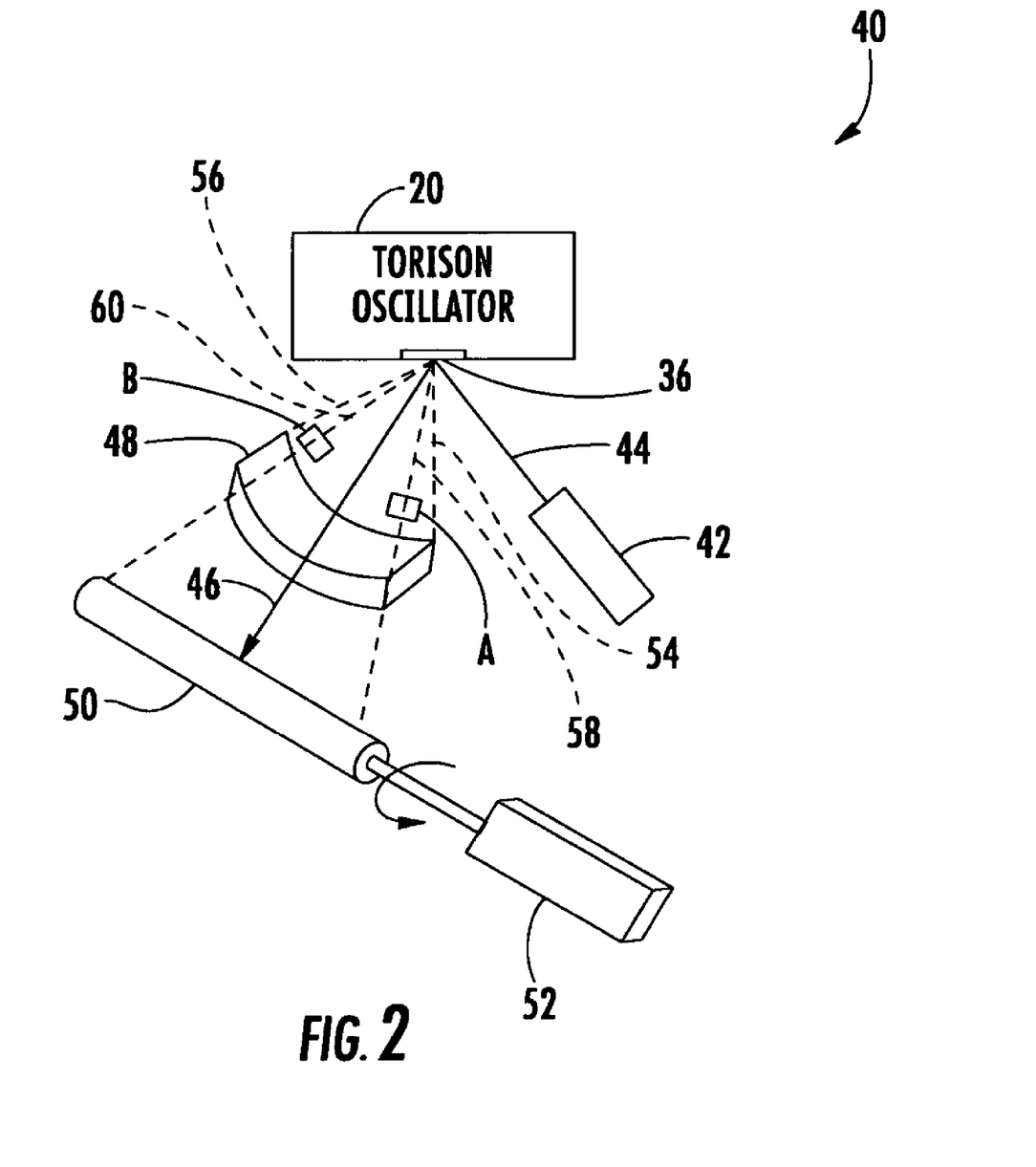
FIG. 2 is a schematic diagram of an imaging system including the torsion oscillator of FIG. 1.

FIG. 2 is a representation of a bidirectional imaging apparatus 40 such as a laser printer 40, including the torsion oscillator 20 of FIG. 1. In FIG. 2, a laser 42 directs a modulated light beam 44 onto the oscillating mirror 36 which is reflected to form a scanned beam represented by middle line 46. The scanned beam 46 is directed through an optical system 48 represented as a lens 48 and onto a rotating photoconductive drum 50 rotated at a controlled rate by a drive system 52.

The reflected light beam represented by the middle line 46 is scanned through a scan path having extremes or outer limits represented by dash lines 54 and 56. An imaging window defined by dash lines 58 and 60 is included within the scan path 54, 56. In the embodiment of FIG. 2, sensors A and B are located within the outer limits represented by the dash lines 54 and 56, more particularly, on the imaging window dash lines 58 and 60. The sensors A and B generate respective electrical signals when the reflected light beam passes the particular sensor. As disclosed in the above-incorporated application Ser. No. 10/329,084, there are a variety of locations where the sensors A and B may be positioned, either inside or outside the optical system represented by the lens 48.

Figure 3:
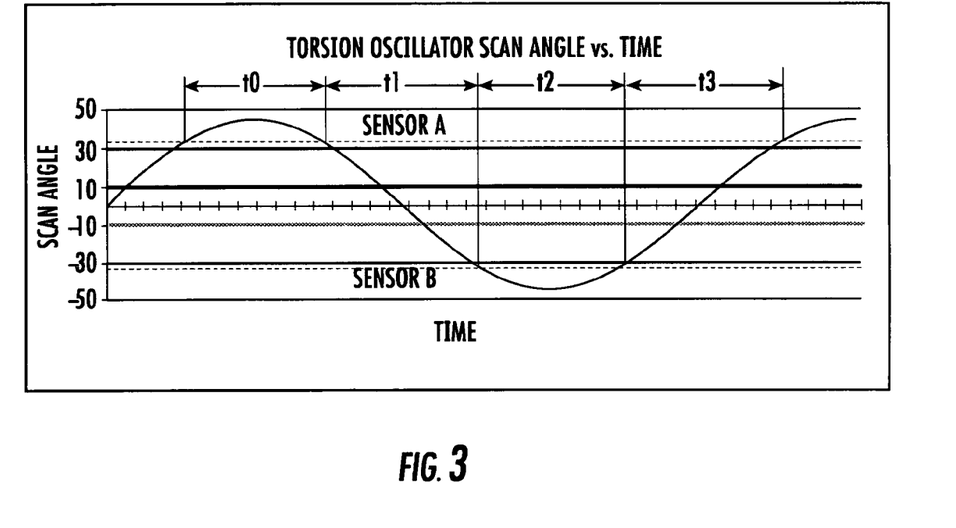
FIG. 3 is a plot of scan angle as a function of time.

FIG. 3 is a plot of scan angle, prior to optical correction, of the scanned beam 46, with time intervals referred to herein as t0, t1, t2 and t3. Time interval t1 corresponds to the time available for forward direction printing in a bidirectional laser printing imaging system, and time interval t3 corresponds to the time available for reverse direction printing in a bidirectional printing laser printer imaging system. The time intervals t0 and t3 thus correspond to the imaging window 58, 60 and are inherently equal. It is important to control time interval t1 (and thus time interval t3) in order to maintain a fixed line length in the laser printer 40 for a given oscillation frequency and a given optical system. Also, the optical system 48 represented by the lens 48 is designed to optically correct the slightly non-linear printing region of the sinusoidal scan angle into a linear scan along the photoconductive drum 50.

Relating FIG. 3 to the FIG. 2 sensors A and B, the beam first encounters sensor A, known to be located where the beam is at a predetermined scan angle a, corresponding to one end 58 of the imaging window. After the beam crosses angle a moving toward the outer limit 54, the beam is again sensed by sensor A as it returns. The interval between these two crossings of sensor A is time interval t0, which may be termed a "turnaround" interval. Forward direction printing time interval t1 then occurs, while the beam moves to be sensed by sensor B, known to be located where the beam is at scan angle b, corresponding to the other end 60 of the imaging window. After crossing angle b, the beam again is sensed by sensor B as it returns. The interval between these two crossings of sensor B is time interval t2, which is another "turnaround" interval. Then, reverse direction printing time interval t3 is the time between the second consecutive sensing of the beam by sensor B and the next sensing of the beam by sensor A, and the cycle repeats. Rotation from sensor A to sensor B may be referred to as direction AB, and corresponds to time interval t1. Rotation from sensor B to sensor may be referred to as direction BA, and corresponds to time interval t3.

The period is expressed as t0+t1+t2+t3, and the frequency of oscillation is the reciprocal of the period. The difference between t0 and t2 is a function of the location of the sensors A and B with respect to the median of the beam sweep and defines the median offset.

Thus, the midpoint of the sine wave of FIG. 3 is shifted from zero by a static offset S. Ideally, the torsion oscillator 20 would oscillate about a physical center position defined by line 46 in FIG. 2. However, due to various factors, including imbalances and structural variances, dynamic phenomena depending upon differences between the physical resonant frequency of the torsion oscillator 20 and the applied electrical driving frequency, and disturbances to the system such as mechanical shock, vibration or air flow, the torsion oscillator 20 typically oscillates about a center position that does not correspond to a physical center line.

Various control strategies may be employed as disclosed in the above-incorporated application Ser. Nos. 10/093,754 and 10/329,084. In general terms, the construction of the torsion oscillator 20 is such that motion of the oscillating mirror 36 and thus movement of the scanned beam is controlled by characteristics of the electrical drive power supplied to the coil 30.

Briefly, for a given oscillation frequency, either the scanning time interval to or the scanning time interval t3 is measured, and a feedback controller develops a drive power amplitude control signal to maintain either t1 or t3 at a desired constant. In addition, the difference between t0 and t2 (e.g., t2−t0) is measured or calculated, and another feedback controller develops an offset control signal to maintain a constant offset. A constant scan interval (t1 or t3) together with a constant offset (t2−t0) maintains the imaging window 58, 60 portion of the scan angle sine wave used for printing (i.e., between the locations of sensors A and B) in a fixed location.

Figure 4:
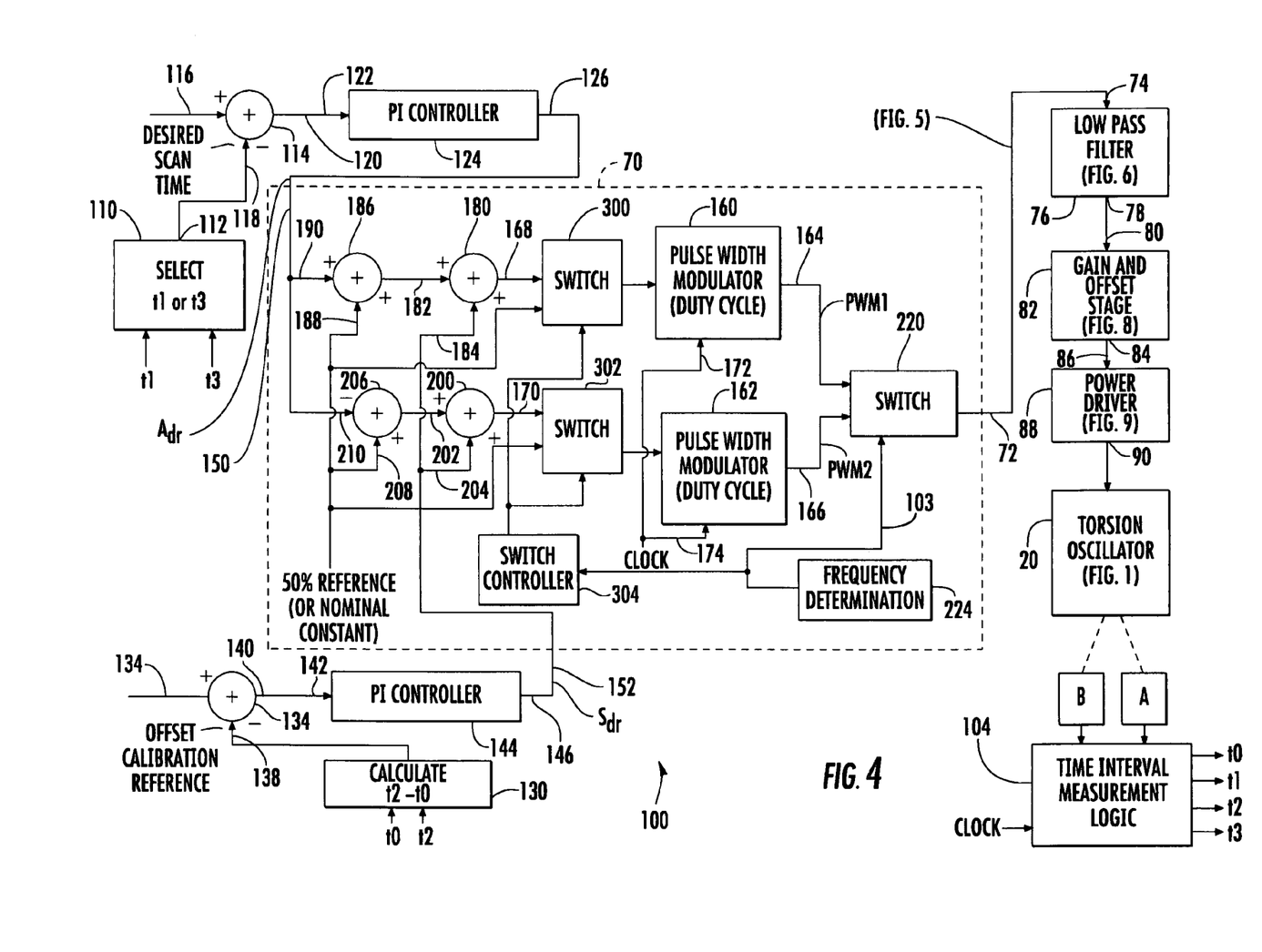
FIG. 4 is a schematic block diagram of apparatus employing the torsion oscillator of FIGS. 1 and 2, including feedback controllers for driving the torsion oscillator.

FIG. 4 is a schematic block diagram of apparatus embodying the invention and employing the torsion oscillator 20 of FIG. 1. It will be appreciated that the system of FIG. 4 also represents a bidirectional imaging apparatus such as the bidirectional imaging apparatus 40 of FIG. 2. However, for simplification, certain elements depicted in FIG. 2, such as the lens 48 and photoconductive drum 50 are omitted from FIG. 4.

Figure 5:
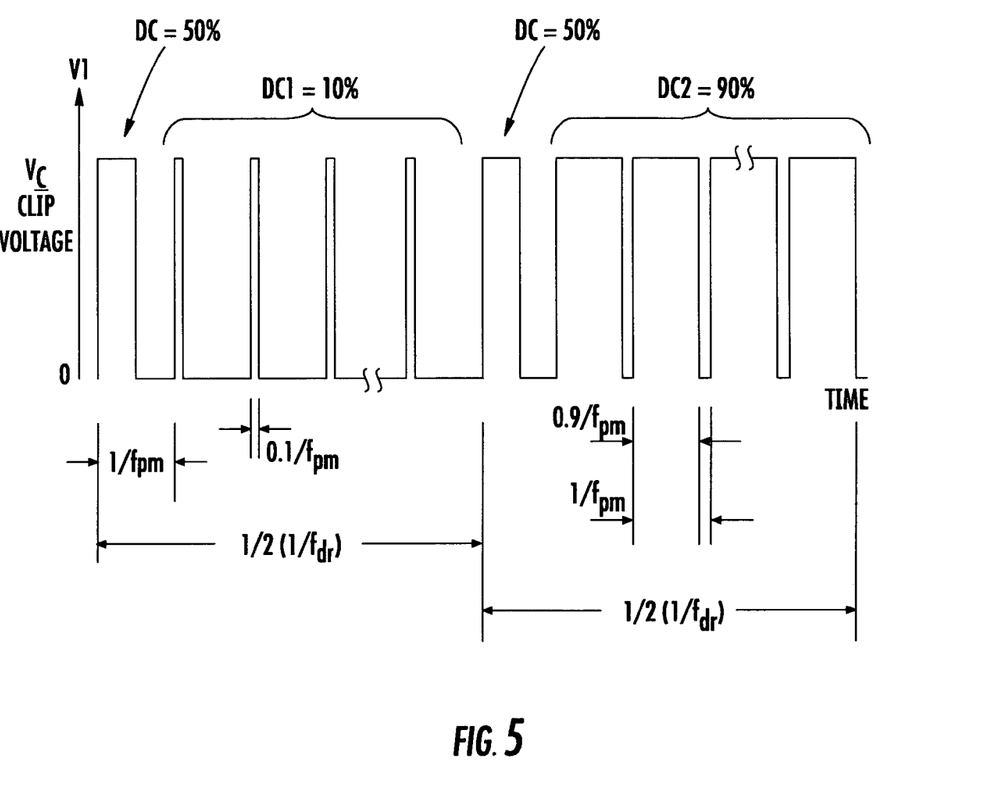
FIG. 5 is a plot of a duty-cycle-controlled waveform at the output of the pulse width modulator subsystem of FIG. 4.

In overview, a pulse width modulator subsystem 70 encodes driver frequency ($f_{dr}$), driver amplitude ($A_{dr}$) and driver offset ($S_{dr}$) control signals which, after further signal conditioning, drive a current through the coil 30 of the torsion oscillator 20. The pulse width modulator subsystem 70 thus generates a stream of duty-cycle-controlled repetitive pulse signals, alternating between two pulse-width-modulated signals PWM1 and PWM2 at an alternating frequency corresponding to the driver frequency ($f_{dr}$). The pulse width modulator subsystem 70 has an output 72, which is connected to the input 74 of a low pass filter 76, described in detail hereinbelow with reference to FIG. 6. A representative repetitive pulse waveform at the output 72 of the pulse width modulator subsystem 70 is shown in FIG. 5, described hereinbelow. The low pass filter 76 has an output 78 which is in turn connected to the input 80 of a gain and offset stage 82, described in detail hereinbelow with reference to FIG. 8. A representative waveform at the output 78 of the low pass filter 76 is described hereinbelow with reference to FIG. 7. The output 84 of the gain and offset stage 82 is in turn connected to the input 86 of a power driver stage 88, also referred to herein as a driver circuit 88, described hereinbelow with reference to FIG. 9. The output 90 of the power driver stage 88, represented as a single line in FIG. 4, is connected to the torsion oscillator 20, and drives the coil 30 of the torsion oscillator 20 with a feedback-controlled current.

Also represented in FIG. 4 are elements of control logic, generally designated 100. Although some elements are represented as functional blocks in FIG. 4, various control logic 100 elements may comprise any type of logic system, and may be implemented in software executing in one or more microprocessors, application specific integrated circuits (ASICs), programmable logic such as a field programmable gate array (FPGA), or other electronic devices. In a typical implementation, the control logic 100 includes the pulse width modulator subsystem 70. The control logic 100 develops the frequency ($f_{dr}$), amplitude ($A_{dr}$) and offset ($S_{dr}$) control signals based on feedback from the A and B sensors, employing techniques disclosed in the above-incorporated patent application Ser. Nos. 10/093,754 and 10/329,084, and described briefly hereinbelow.

Figure 6:
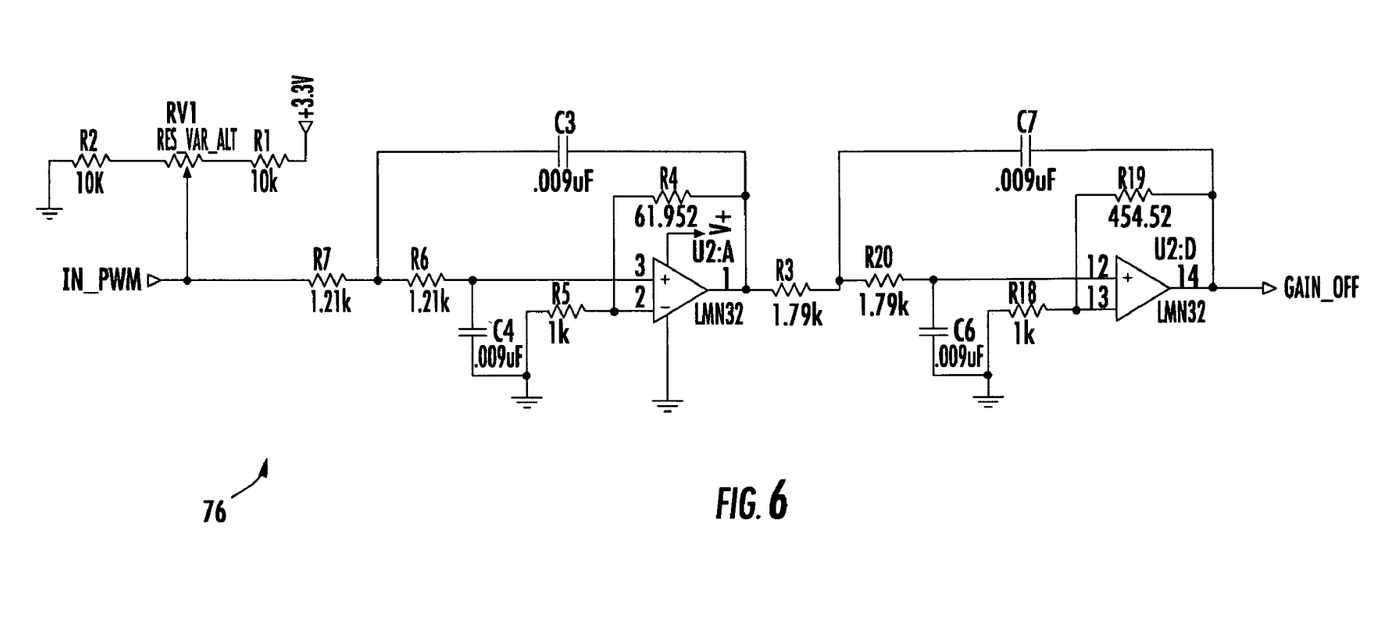
FIG. 6 is an electrical schematic circuit diagram of the low pass filter shown as a block in the schematic block diagram of FIG. 4.
Figure 8:
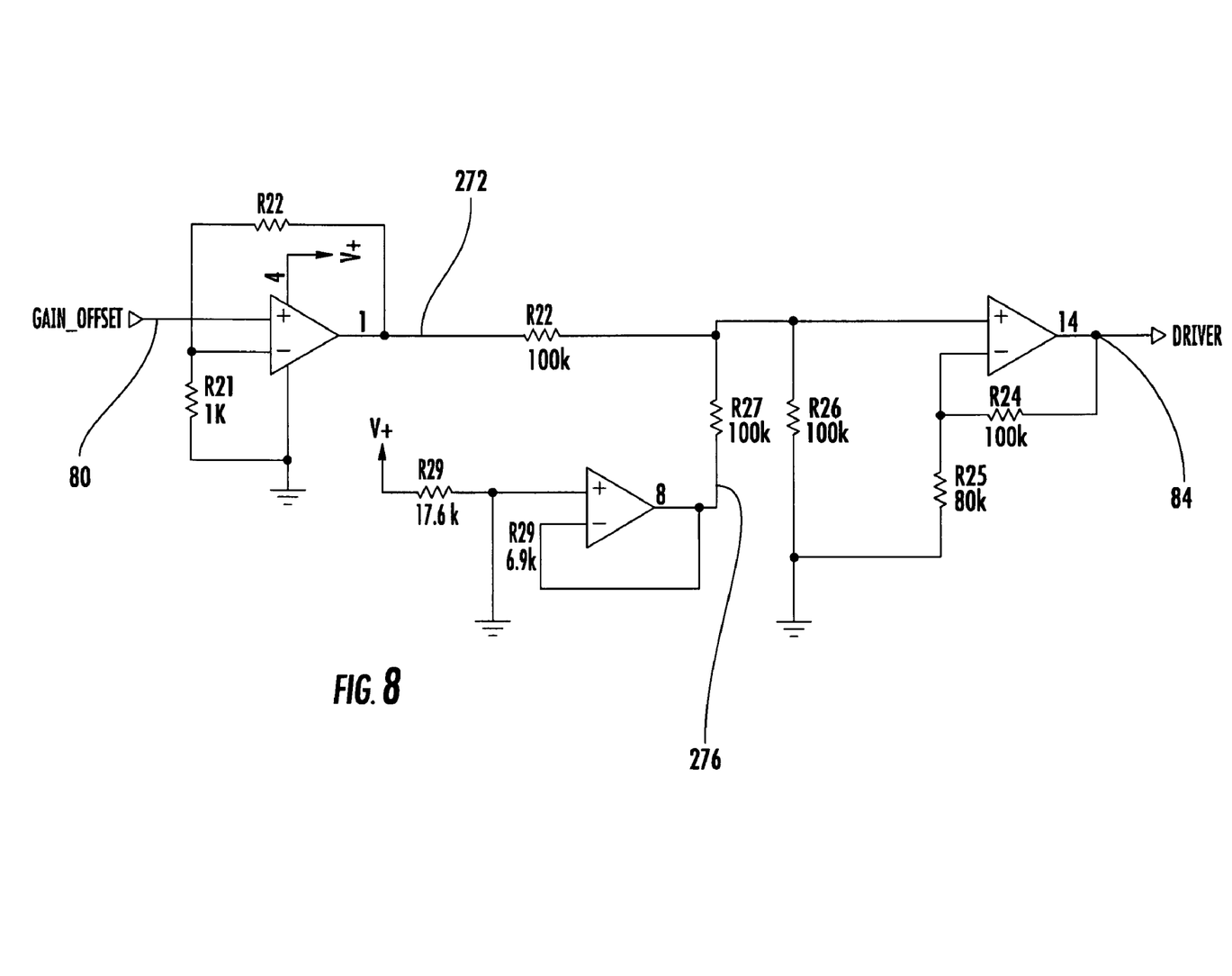
FIG. 8 is an electrical schematic diagram of the gain and offset stage shown as a block in the diagram of FIG. 4.
Figure 9:
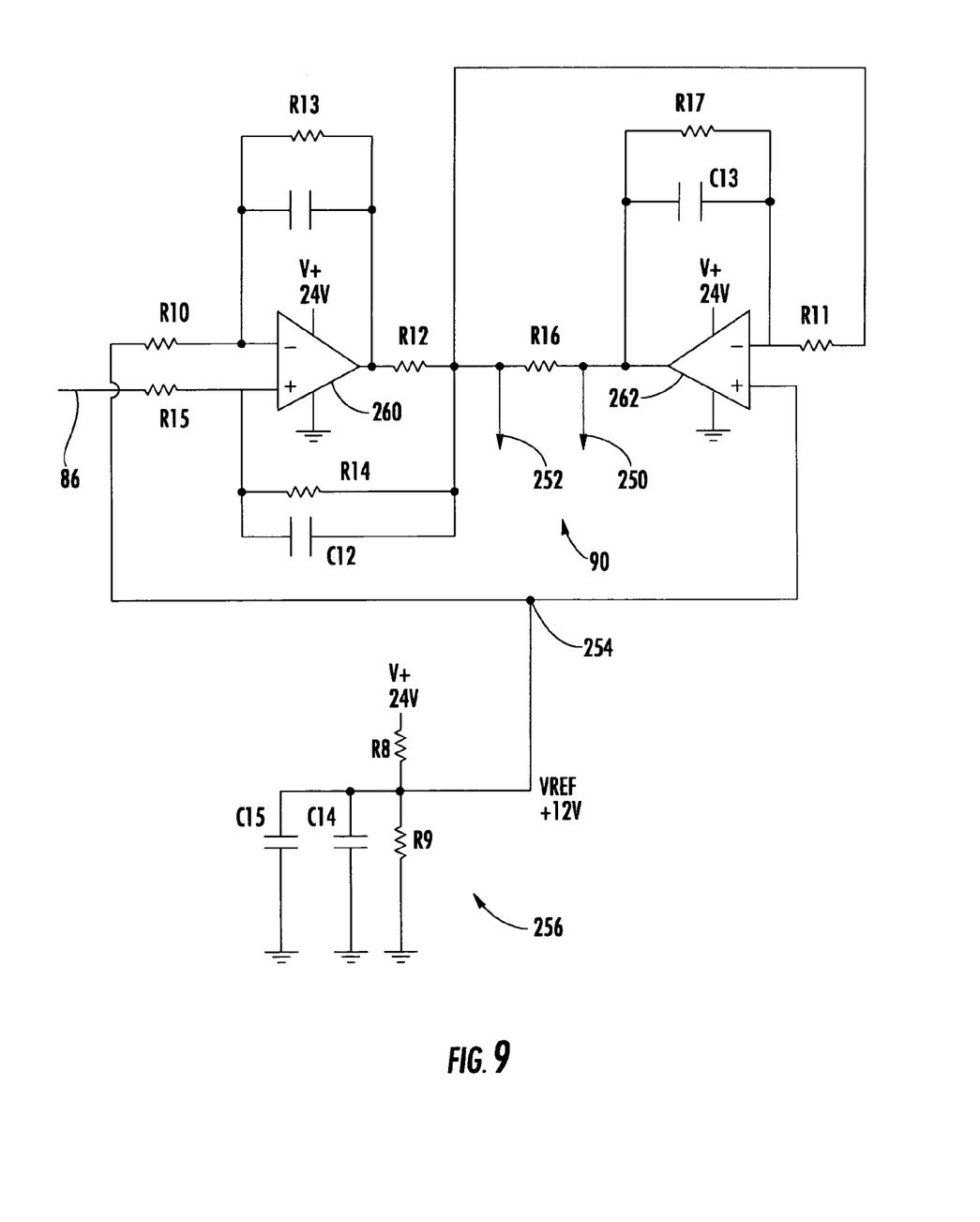
FIG. 9 is an electrical schematic diagram of the power driver stage shown as a block in the diagram of FIG. 4.

Advantageously, the embodiment disclosed herein, including the control logic 100, the FIG. 6 low pass filter 76 circuit, the FIG. 8 gain and offset stage 82 circuit, and the FIG. 9 power driver stage 88 circuit requires only two single-ended DC power supplies, of 24 volts (+24V or V+) and 3.3 volts (+3.3V), each referenced to circuit ground.

Considering the control logic 100 of FIG. 4 in greater detail, a frequency determination block 224 generates a signal which represents and which may generally be termed the driver frequency control signal ($f_{dr}$) or alternatively a driver period signal at the output 103 of the frequency determination block 224. The signal at the output 103 is typically a digital number representing the driver period, with an equivalent resolution of approximately 0.1 Hz. During typical operation, after the driver frequency ($f_{dr}$) has initially been determined as described in the above-incorporated patent applications, the frequency is held constant, and it is the driver amplitude ($A_{dr}$) and driver offset ($S_{dr}$) control signals which are determined based on feedback.

Briefly considering the determination of the driver amplitude control signal ($A_{dr}$), as part of one feedback loop, a block 110, which has an output 112, selects either the time interval t1 (corresponding to forward direction printing) or the time interval t3 (corresponding to reverse direction printing). Referring to the lower right corner of FIG. 4, all time intervals are determined by logic 104, which receives or internally generates a clock signal and also receives sensor signals A and B. Based on these signals, the logic 104 generates output signals to through t3 in accordance with the description above in reference to FIG. 3. An adder 114 has a (+) input 116 to which is connected a reference voltage $V_{ref}$, which represents a desired scan time. The adder 114 also has a (−) input 118 which receives the measured t1 or t3 time interval from block 110. At the output 120 of the adder 114 is a $V_{error}$ signal which is connected to the input 122 of a Proportional plus Integral (PI) controller 124. At the output 126 of the PI controller 124 is the driver amplitude control signal ($A_{dr}$) for driving the torsion oscillator 20 coil 30 current. The PI feedback controller 124 may be implemented in software.

Briefly considering the determination of the driver offset control signal ($S_{dr}$), as part of another feedback loop, a block 130 determines or calculates the difference between intervals t0 and t2, generating the measured value of t2−t0 at its output 132. The difference between these two "turnaround" intervals t0 and t2 is thus measured offset, and can have either a positive or a negative value. An adder 134 has a (+) input 134 which receives an offset calibration reference $V_{ref}$, which may be determined either by adjustment or by an automatic power-on calibration routine. The adder 134 also has a (−) input 138 which receives the measured t2−t0 signal from block 130. The output 140 of the adder 134 is an error signal $V_{error}$, which is connected to the input 142 of another Proportional plus Integral (PI) controller 144. The output 146 of the PI controller 144 is the offset control signal ($S_{dr}$) which likewise may be a digital value representing offset information. The offset control signal ($S_{dr}$) can have either a positive or a negative value, depending upon the measured relationship of the "turn around" time intervals t0 and t2. Likewise, the PI feedback controller 144 may be implemented in software.

The driver amplitude control signal ($A_{dr}$) output 126, the driver offset ($S_{dr}$) control signal output 146 and the driver frequency ($f_{dr}$) control signal output 103 are connected to respective control inputs 150, 152 and 154 of the pulse width modulator subsystem 70 which, based on these inputs, generates the stream of repetitive pulse signals at its output 72 encoding these amplitude, offset and frequency control signals.

More particularly, the pulse width modulator subsystem 70 generates a stream of repetitive pulse signals which alternate between two controlled duty cycles (corresponding to the signals PWM1 and PWM2) at an alternating frequency corresponding to the driver frequency control signal ($f_{dr}$) at input 154. One of the two controlled duty cycles (corresponding to PWM1) is controlled based on a design nominal duty cycle, such as a 50% duty cycle, plus the amplitude control signal ($A_{dr}$) at input 150, and summed with the offset control signal ($S_{dr}$) (which may have either a positive or negative value at input 152). The other of the controlled duty cycles (corresponding to PWM2) is controlled based on the design nominal duty cycle value (e.g. 50%) minus the amplitude control signal ($A_{dr}$) at input 150, and summed with the offset control signal ($S_{dr}$) at input 152.

The pulse width modulator subsystem 70 more particularly comprises first and second pulse width modulators 160 and 162 configured to generate the repetitive pulse signals PWM1 and PWM2 having respective controlled duty cycles DC1 and DC2 at respective outputs 164 and 166. The pulse width modulators 160 and 162 have respective control inputs 168 and 170 to which duty cycle control inputs are connected. For purposes of discussion it is convenient to describe duty cycles in terms of percentages. However, in an actual implementation, these duty cycles are represented in an FPGA or microprocessor as numbers.

In the exemplary embodiment, the first and second pulse width modulators 160 and 162 are conventional and each implements a count-and-compare function. An N-bit wide counter counts, for example, down clocked by a high speed clock, and the count or value of the counter is constantly compared with a reference number or value held in a latch (not shown), which represents the desired duty cycle. When some function of the values is satisfied (such as equal, greater than, or less than) the state of the output signal is changed, to produce the PWM1 or PWM2 signal at the output 164 or 166. What may be termed the Pulse Width Modulation frequency (PWM frequency or $f_{pwm}$) (see FIG. 5) is calculated by dividing the clock frequency by the maximum range of the reference number or value used to represent the desired duty cycle. The number used to represent the desired duty cycle can be at most $2^N-1$, where N is the number of available counter bits. In an exemplary embodiment, the pulse width modulators 160 and 162 include 10-bit PWM counters and have respective clock inputs 172 and 174 to which a 60 MHz clock signal is applied. In this example, $f_{pwm}$ (60 MHz divided by $2^{10}$) is 58593.75 Hz. Since $2^{10}$ is 1024, and approximately half of that range is available for amplitude control purposes because amplitide control adjusts the amount of drive equally positive and negative with respect to the "zero" amplitude level, the equivalent resolution for duty cycle control of amplitude is 1/512. When the number used to represent the desired duty cycle is 511 (assuming PWM counters that count from 1023 down to 0), the resultant duty cycle expressed as a percentage is 50%.

The duty cycle control signal for the first pulse width modulator 160 is produced by a first adder 180 which generates the first duty cycle control signal based on the design nominal duty cycle value plus the driver amplitude control signal ($A_{dr}$) applied to a (+) input 182 of the first adder 180, summed with the offset control signal applied to another (+) input 184 of the first adder 180. Cooperating with the first adder 180 is an adder 186 having a (+) input 188 which receives a value representing the design nominal duty cycle value, typically representing a 50% duty cycle, and another (+) input 190 which receives the driver amplitude control signal ($A_{dr}$) and thus adds the driver amplitude control signal ($A_{dr}$). The output of adder 186 is connected to the (+) input 182 of the first adder 180.

Similarly, the duty cycle control signal for the second pulse width modulator 162 is produced by a second adder 200 which generates the second duty cycle control signal based on the design nominal duty cycle value minus the driver amplitude control signal ($A_{dr}$) applied to a (+) input 202 of the second adder 200, summed with the offset control signal applied to another (+) input 204 of the second adder 200. Cooperating with the second adder 200 is an adder 206 having a (+) input 208 which receives a value representing the design nominal duty cycle value, and a (−) input 210 which receives the driver amplitude control signal ($A_{dr}$) and thus subtracts the amplitude control signal ($A_{dr}$). The output of adder 206 is connected to the (+) input 202 of the second adder 200.

The outputs 164 and 166 of the first and second pulse width modulators 160 and 162 (i.e., the PWM1 and PWM2 signals) are connected to a switch 220 which has a single output 222. The switch 220 alternately and for equal half-periods selects the outputs 164 and 166 of the first and second pulse width modulators 160 and 162 and thus the signals PWM1 and PWM2 at the alternating frequency corresponding to the driver frequency control signal ($f_{dr}$). The driver frequency control signal ($f_{dr}$) or alternatively, the driver period signal, which in turn controls the switch 220. The frequency determination block 224 is clocked at 60 MHz and includes a relatively wide accumulator, such as a 32-bit accumulator, to which a constant value is added at intervals defined by the clock. This constant value is a driver period number which represents the driver frequency control signal ($f_{dr}$). When the accumulator overflows, the output signal state is toggled, causing the switch 222 to alternately select the outputs 164 and 166. Accordingly, the driver period number is selected to result in a switch between PWM1 and PWM2 every one-half cycle of the desired torsion oscillator driver frequency ($f_{dr}$).

FIG. 5 represents the output waveform voltage $V_1$ as a function of time of the pulse width modulator subsystem 70, which also is the output of the switch 220. In the particular example of FIG. 5, the duty cycle DC1 of the first pulse width modulator 160 is 10% (PWM1 signal), and the duty cycle DC2 of the second pulse width modulator 162 is 90% (PWM2 signal). A clip voltage $V_C$ is used to carefully maintain the peak value of the voltage $V_1$ at a known value for the extraction of offset information in the gain and offset stage 82, described hereinbelow with reference to FIG. 8. The driver frequency ($f_{dr}$), driver amplitude ($A_{dr}$) and driver offset ($S_{dr}$) control signals are all encoded in the FIG. 5 waveform. Driver frequency is represented by its reciprocal $1/f_{dr}$, which is the driver period. Each half-cycle is thus represented as $\frac{1}{2}(1/f_{dr})$, generated based on the constant value (driver period number) added at periodic intervals to the accumulator within the frequency determination block 224. The driver period number thus controls the resultant torsion oscillator 20 coil 30 drive current frequency, which controls the resultant torsion oscillator 20 scan angle frequency in steady state. The PWM frequency is represented by its reciprocal $1/f_{pwm}$, during which period the voltage $V_1$ is either 0 or $V_C$ for respective durations corresponding to the controlled duty cycle.

Figure 7:
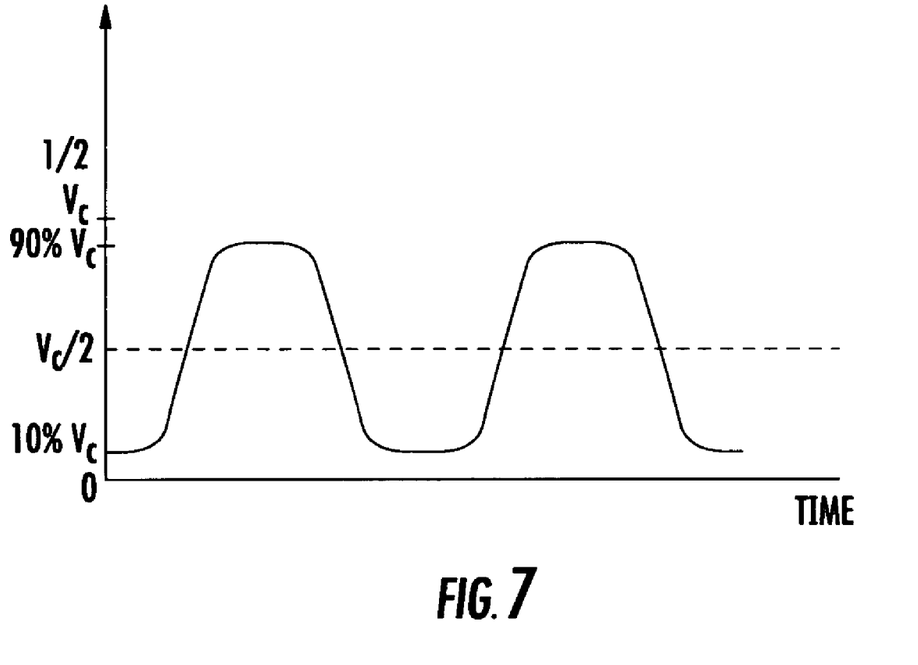
FIG. 7 is a plot depicting a representative waveform at the output of the low pass filter.

The corresponding output 78 of the low pass filter 76 is depicted in FIG. 7, as a filtered voltage $V_2$ which oscillates around a midpoint voltage of $V_C$. The low pass filter 76 is a 4th order Butterworth low pass filter having a break frequency of approximately 10 kHz for an $f_{pwm}$ of approximately 50 kHz. The filtered output voltage $V_2$ oscillates about midpoint voltage $V_C/2$ in the illustrated example because the two duty cycles DC1 and DC2 of 10% and 90% respectively are symmetrical about a 50% duty cycle. (A constant 50% duty cycle PWM voltage would be filtered into a voltage equal to 50% of the clip voltage $V_C$.) Thus, the offset of this oscillating voltage is zero volts relative to $V_C/2$, because the average duty cycle of 10% and 90% is 50%. In addition, the peak-to-peak amplitude of voltage $V_2$ is directly related to the 80% difference in duty cycle between the 10% and 90% values used in this example.

Thus, the peak-to-peak amplitude of the filter 76 output voltage $V_2$ is directly related to DC2−DC1, assuming DC2 is greater than DC1 as it is in the illustrated embodiment. The offset from the midpoint $V_C/2$ can be expressed as $$\left(\frac{DC1 + DC2}{2} - 50\%\right) \times V_c.$$

As a different example (waveforms not shown) if duty cycles of 15% for DC1 and 95% for DC2 were selected, the same peak-to-peak amplitude of the filter output voltage $V_2$ results, because the difference between 15% and 95% is still 80%. However, the filter output voltage would have a non-zero offset from $V_C/2$. In particular, the offset would be $$\left(\frac{95\% + 15\%}{2} - 50\%\right) \times V_c = 5\% \text{ of } V_c.$$

As another consideration, in FIG. 5 the transition from the DC1 (e.g. 10%) duty cycle state to the DC2 (e.g. 90%) duty cycle state does not necessarily occur on a PWM clock boundary. This is because the drive frequency $f_{dr}$ is almost never an integer multiple of the PWM frequency $f_{pwm}$. Although the PWM frequency $f_{pwm}$ is high compared to the drive frequency $f_{dr}$, the resolution of the drive frequency $f_{dr}$ also is high. The state transition of the $f_{dr}$ signal drives the "switch" between duty cycle sources DC1 and DC2 (FIG. 4 switch 220), but this switching instant almost always occurs within a PWM cycle of either DC1 or DC2. It is the switching from one duty cycle to another while somewhere within a PWM cycle that produces the glitch, which can be described as an instantaneous single cycle of an inappropriately high or low duty. This results in a disturbance, or glitch, at this transition point that can transmit all the way through the system to the torsion oscillator 20. These glitches can cause a distortion of the scan angle from the shape (sinusoidal in FIG. 3) assumed in designing the optical linearity correction system within the optical system 48. This can result in linearity errors which may be visible on a printed page. Thus the PWM clock frequency, $f_{pwm}$, is desired to be as high as is practical, relative to the driver frequency, $f_{dr}$, to minimize the effects of this disturbance glitch caused when interrupting one PWM sequence to switch to the other PWM sequence in the middle of a PWM cycle. In the exemplary embodiment disclosed herein, the PWM frequency $f_{pwm}$ is approximately 50 kHz for a driver frequency $f_{dr}$ of approximately 3.2 kHz.

To further reduce the magnitude of this glitch, as illustrated in FIG. 5, at the region of the transition from DC1 to DC2, the duty cycle is changed from DC1 to a 50% duty cycle for at least one PWM cycle and then shifted to DC2. Likewise at least one PWM cycle of a 50% duty cycle is introduced prior to changing from DC2 to DC1. A glitch is still generated, but is on average smaller than without the 50% cycle insertion. The structure (hardware or software) for introducing a 50% duty cycle prior to changing from DC1 to DC2 or vice versa is represented in FIG. 4 by switches 300 and 302. One input to switch 300 is signal 168 from the first adder 180. Likewise, one input to switch 302 is signal 170 from the second adder 200. The second input to both switches 300 and 302 is a fixed 50% duty cycle for one Pulse Width Modulator period. The control of switches 300 and 302 is derived from the frequency determination block 224 output. The switch controller 304 represents logic capable of triggering the switches 300 and 302 to the 50% duty cycle at the region of the transition from DC1 to DC2 and vice versa. This arrangement is an implementation of the waveform shown in FIG. 5.

An alternative technique of "rounding" the transition from DC1 to DC2 by allowing the previous PWM cycle to finish before switching to DC2 (a technique frequently employed in DC motor controllers) is not acceptable for driving the torsion oscillator 20 because such would introduce jitter in the driving signal to the torsion oscillator 20.

FIG. 6 is an electrical schematic circuit diagram of the low pass filter 76, which is a 4th order Butterworth low pass filter including two operational amplifiers 240 and 242 operated from a single-ended power supply with a V+ power supply voltage of +24 volts. Type number LM324 is suitable for the operational amplifiers 240 and 242.

In general but with an exception noted hereinbelow, the FIG. 6 low pass filter 76 circuit is of standard design, with two stages corresponding to the two operational amplifiers 240 and 242, and an input node 74. The first operational amplifier 240 has a pair of input resistors R7 and R6 (1.21 k Ohm each) connected in series between the input node 74 and the non-inverting (+) input of the operational amplifier 240. Another input resistor R5 (1 k Ohm) is connected between the inverting (−) input and circuit ground. A capacitor C4 (0.009 μF) is connected between the non-inverting (+) input and circuit ground. A feedback resistor R4 (61.9 Ohm) is connected between the operational amplifier 240 output and the inverting (−) input, and a feedback capacitor C3 (0.009 μF) is connected between the operational amplifier 240 output and the junction of input resistors R7 and R6.

The second operational amplifier 242, which has a pair of input resistors R3 and R20 (1.79 k Ohm each) connected in series between the output of the first operational amplifier 240 and the non-inverting (+) input of the second operational amplifier 242. An input resistor R18 (1 k Ohm) is connected between the inverting (−) input and circuit ground, and a capacitor C6 (0.009 μF) is connected between the non-inverting (+) input and circuit ground. A feedback resistor R19 (454 Ohm) is connected between the operational amplifier 242 output and the inverting (−) input, and a feedback capacitor C7 (0.009 μF) is connected between the operational amplifier 242 output and the junction between the two input resistors R3 and R20.

With the indicated component values, the Butterworth low pass filter 76 has a break frequency of approximately 10 kHz for a PWM frequency of 50 kHz. The transfer function in the Laplace domain (S is the Laplace operator) for the first stage of this two stage filter (assuming C=C3=C4 and R6=R7) is:

$$\frac{V_{out}}{V_{in}} = \frac{R4 + R5}{S^2(C^2 \times R6^2 \times R5) + S(2C \times R6 \times R5 - C \times R6 \times R4) + R5} \quad (1)$$

The second stage transfer function is the same with C=C6=C7=C3=C4, R3=R20, R4 replaced by R19, and R5 replaced by R18, which yields a total transfer function for both stages of:

$$\frac{V_{out}}{V_{in}} = \frac{R4 + R5}{S^2(C^2 \times R6^2 \times R5) + S(2C \times R6 \times R5 - C \times R6 \times R4) + R5} \times \frac{R19 + R18}{S^2(C^2 \times R3^2 \times R18) + S(2C \times R3 \times R18 - C \times R3 \times R19) + R18} \quad (2)$$

From equation (2) it can be seen that the natural frequency of the first stage is (1/C×R6) and for the second stage the natural frequency is (1/C×R3) rad/sec. Thus the break frequency of stage one is 91.8 K rad/sec or 14.6 kHz and the break frequency of stage two is 62.1 K rad/sec or 9.88 kHz. When the two stages are combined, the break frequency is about 75 K rad/sec or 11.94 kHz. The static gain of the FIG. 6 low pass filter 76 circuit is 1.544.

As noted above, the FIG. 6 low pass filter 76 circuit is in general of standard design. As an aspect of the invention, the low pass filter 76 circuit includes a pull-to-nominal circuit 244 configured such that, in the event the input 74 of the low pass filter 76 is disconnected from the output 76 of the pulse width modulator subsystem 70 (FIG. 4), the driver circuit 88 (FIG. 4) provides no drive to the torsion oscillator 20. With reference to FIG. 6, in the disclosed embodiment the pull-to-nominal circuit 244 is a voltage divider circuit 244 connected to the input node 74. The voltage divider 244 includes two resistors R1 and R2 (10 k Ohm each) connected in series between the +3.3 volt supply and circuit ground, with an intermediate variable resistor RV1 which serves as an adjustment. With the input to the FIG. 6 circuit removed, the voltage at the input node 76 is adjusted to 50% of $V_C$. In FIG. 6, $V_C$ is +3.3 volts, and 50% of $V_C$ is +1.65 volts. 50% of $V_C$, is the nominal zero offset voltage that would be generated with a 50% duty cycle PWM signal. As a result, no DC current is supplied to the torsion oscillator 20 drive coil 30 when the input to the FIG. 6 low pass filter 76 circuit is disconnected.

FIG. 8 is an electrical schematic circuit diagram of the gain and offset stage 82 and FIG. 9 is an electrical schematic circuit diagram of the power driver stage 88, also referred to herein as a driver circuit 88. The FIG. 8 gain and offset stage 82 and the FIG. 9 power driver stage 88 cooperate to drive the torsion oscillator 20, more particularly the coil 30 thereof, with a current depending on the voltage level at the output 78 of the FIG. 6 low pass filter 76. In view of the manner in which the gain and offset stage 82 and the power driver stage 88 cooperate, FIGS. 8 and 9 are described together.

The FIG. 9 driver circuit 88 is a voltage controlled current source, more particularly, a Howland bridged amplifier voltage controlled current source. Unlike the typical bridged amplifier current source where the driver reference voltage $V_{ref}$ is ground or zero volts, in the FIG. 9 circuit $V_{ref}$ is +12 volts, which may also be referred to as the nominal zero coil control current voltage level. The driver circuit 88 output, generally designated 90 in FIG. 4, in FIG. 9 comprises two output nodes 250 and 252 which are connected to the terminals 32 and 34 of the torsion oscillator 20 coil 30 (FIG. 1). The FIG. 9 power driver circuit 88 has an input node 86 corresponding to the input 86 shown in FIG. 4. The power driver circuit 88 serves to drive the torsion oscillator 20, more particularly the coil 30 thereof, with a current in one direction when the voltage at the input node 86 is above the driver reference voltage $V_{ref}$, and drives the torsion oscillator 20 coil 30 with a current in the opposite direction when the voltage at the input node 86 is below the driver reference voltage $V_{ref}$.

In the illustrated embodiment, the driver circuit 88 is operated from a +24 volt supply voltage, and the driver reference voltage is one-half the V+ voltage, or +12 volts. In FIG. 9, the +12 volt $V_{ref}$ voltage is developed at a node 254 by a voltage divider 256 comprising series-connected resistors R8 and R9 (1 K Ohm each) connected between the +24 volt V+ supply and circuit ground. To reduce noise, bypass capacitors C14 (0.1 μF) and C15 (1 μF) are connected between the $V_{ref}$ node 254 and circuit ground. The transconductance of the FIG. 9 driver circuit 88 is ±100 mA/5 volts, for a voltage input at node 86 centered on +12 volts. Accordingly, if the voltage input at node 86 is +17 volts, as an example, the drive current supplied to the coil 30 is +100 mA, since +17 volts−12 volts=+5 volts. If the voltage input at the node 86 is +7 volts, as another example, then the drive current supplied to the coil 30 is −100 mA, since +7 volts−12 volts=−5 volts.

The FIG. 9 driver circuit 88 more particularly comprises a "master" amplifier 260 and a "slave" amplifier 262, which may comprise a Burr-Brown OPA551 amplifier capable of supplying a 300 mA of output current. The output node 250 is connected to the output of the "slave" amplifier 262, and the output node 252 is connected to the output of the "master" amplifier 260 through a sense resistor R12 (10 Ohm). The coil 30 connected to the output nodes 250 and 252 sees a voltage differential across it which can be in either direction based upon the input control voltage at node 86 relative to the +12 volt voltage $V_{ref}$. A stabilizing resistor R16 (819 Ohm) is connected between the output nodes 250 and 252 in parallel with the torsion oscillator 20 coil 30.

The "slave" amplifier 262 is a unity-gain inverting amplifier having an input resistor R11 (1 k Ohm) connected to its inverting (−) input and a feedback resistor R17 (1 k Ohm) connected between its output and the inverting (−) input. A capacitor C13 (10 pf) in parallel with the feedback resistor R17 aids in stabilizing the output current. The non-inverting (+) input is connected to the $V_{ref}$ node 254.

The "master" amplifier 260 has a pair of input resistors R10 and R15 (49.9 k Ohm each) connected to the inverting (−) and non-inverting (+) inputs. A negative feedback resistor R13 (10 k Ohm) is connected between the output and the inverting (−) input, and a positive feedback resistor R14 (10 k Ohm) is connected between the amplifier 260 output (through the 10 Ohm sense resistor R12) and the non-inverting (+) input. The other end of the input resistor R10 is connected to the $V_{ref}$ node 254, and the other end of the input resistor R15 is connected to the input node 86. Capacitors C11 and C12 (100 pf each) are connected in parallel with feedback resistors R13 and R14, respectively, to stabilize the output current.

During operation, the current supplied through the parallel combination of the coil 30 and the stabilizing resistor R16 is sensed as the voltage drop across sense resistor R12. The voltage drop across R12 is treated as a positive input voltage to "master" amplifier 260 which is balanced with the difference between the driver control voltage at input node 86 and the +12 volt $V_{ref}$ voltage at node 254. Likewise, the voltage drop across the sense resistor R12 is treated as a negative input to "slave" amplifier 262, which is balanced against $V_{ref}$ connected directly to the non-inverting (+) input of "slave" amplifier 262. When no current is flowing through the load (i.e., the parallel combination of the coil 30 and stabilizing resistor R16), the control voltage into input resistor R15 is equal to the $V_{ref}$ driver reference voltage. In this case of no load current, the voltage drop across the sense resistor R12 is zero, and the output voltage of the "slave" amplifier 262 is equal to +$V_{ref}$, and the output voltage of the "master" amplifier 260 is also +$V_{ref}$. Thus, the driver circuit 88 can provide a drive current in either direction through the coil 30 by creating a voltage differential about +$V_{ref}$ at each of the amplifiers 260 and 262 even though the supply voltage, V+, is single-ended.

The static gain relationship of the FIG. 9 circuit (capacitor effects assumed to be negligible), where it is assumed that R13=R14, R10=R15 and R17=R11, is:

$$I_{load} = \frac{-\text{Expression1} - \text{Expression2}}{\text{Expression3}}, \text{ where} \quad (3)$$

Expression1=R13[2×R10×R12+{(R10+R13)(2×R13+R12)−R12×R10}]×V$_{drive}$
Expression2=V$_{ref}$[(4×R10×R13(R10+R13))−(R13+2*R10){(R10+R13)(2×R13+R12)−R12×R10}]
Expression3=R10[R$_{load}${(R10+R13)(2×R13+R12)−R12×R10}+2×R13(R10+R13)(R12−R$_{load}$)]

In its approximate form, which is simpler for selecting key resistor values, the relationship between the drive voltage V$_{drive}$, the reference voltage V$_{ref}$ and the output current I$_{load}$ can be expressed as:

$$I_{load} \approx -\{R13/(R10 \times R12)\} \times \{V_{drive} - V_{ref}\} \quad (4)$$

The FIG. 8 gain and offset stage 82 circuit serves to adjust and shift the output of the FIG. 6 low pass filter to a voltage level corresponding to the driver reference voltage V$_{ref}$(+12 volts) when the output of the low pass filter 76 corresponds to zero drive to the torsion oscillator 20. At the input 74 of the FIG. 6 low pass filter 76, 1.65 volts (one-half of the 3.3 volt V$_C$ voltage) corresponds to a nominal zero coil current. With a static gain of 1.544 in the FIG. 6 low pass filter, the voltage corresponding to nominal zero coil current at the output 78 of the low pass filter 76, which is the input 80 of the FIG. 8 gain and offset stage 82 is 2.547 volts.

In FIG. 8, a first amplifier 270 having an output node 272 serves as a buffer amplifier having a static gain of 1.976, determined by a negative feedback resistor R22 (976 Ohms) connected between the amplifier output and the inverting (−) input, and an input resistor R21 (1 k Ohm) connected between the inverting (−) input and circuit ground. The input node is connected to the non-inverting (+) input. As a result, the nominal zero coil current offset control voltage of 1.65 volts at the input node 74 of the FIG. 6 low pass filter 76 circuit is increased to 5.034 volts at the output node 272 within the FIG. 8 gain and offset stage 82 circuit.

In order to shift the nominal zero coil current offset control voltage to operate around V+/2 (which is +12 volts in the case of a +24 volt supply voltage in the embodiment disclosed herein), a second amplifier 274 is employed. The second amplifier 274 has a pair of input resistors R23 and R27 (100 k Ohm each), connected to the non-inverting (+) input, which serves as a summing junction. The other ends of the input resistors R23 and R27 are respectively connected to the node 272 and to a buffered reference voltage node 276 which, in the disclosed embodiment, has a fixed voltage of 6.63 volts. The second amplifier 274 has unity gain, and additionally has a 100 k Ohm negative feedback resistor connected between its output and the inverting (−) input, as well as input resistors R26 (100 k Ohm) and R25 (50 k Ohm) connected respectively between the non-inverting (+) and inverting (−) inputs and circuit ground.

To provide the buffered reference voltage at the node 276, a third amplifier 278 is configured as a simple buffer amplifier having its non-inverting (+) input connected to a voltage divider 208 including series-connector resisters R29 (17.4 k Ohm) and R28 (8.65 k Ohm), and supplied from the +24 volt V+ supply.

Accordingly, the signal voltage at node 276 and the buffered reference voltage at node 276 are added together and multiplied by a gain of 1.0 by amplifier 278, resulting in a nominal zero coil current offset control voltage of +11.66 volts at the output node 84, assuming all components are perfectly at their nominal values. To correct for this difference from the desired +12 volt nominal zero coil current offset control voltage, the variable resistor RV1 of the FIG. 6 pull-to-nominal circuit 244 is adjusted for zero coil current when the input of the FIG. 6 low pass filter 76 is disconnected from the FIG. 4 pulse width modulator subsystem 72.

In addition, when the pulse width modulator output of the pulse width modulator subsystem 70 is connected to the input 74 of the Butterworth low-pass filter 76, an average PWM slightly different from the nominal 50% average PWM may need to be selected to generate zero output current in the face of these component tolerances.

While specific embodiments of the invention have been illustrated and described herein, it is realized that numerous modifications and changes will occur to those skilled in the art. It is therefore to be understood that the appended claims are intended to cover all such modifications and changes as follow in the true spirit and scope of the invention.

The invention claimed is:

1. A system for driving an oscillator based on control signals, comprising:
    a modulator subsystem configured to generate a stream of repetitive pulse signals which encodes frequency and amplitude control signals;
    a low pass filter for filtering the stream of repetitive pulse signals to provide a filtered output; and
    a driver circuit for driving the torsion oscillator based on the filtered output.

2. The system of claim 1, wherein said driver circuit comprises a voltage controlled current source.

3. The system of claim 1, which further comprises a feedback controller for generating at least the amplitude control signal and an offset control signals.

4. The system of claim 1, wherein the modulator subsystem is configured to generate a stream of repetitive pulse signals which encodes frequency, amplitude and offset control signals.

5. A system for driving a torsion oscillator based on frequency, amplitude and offset control signals, comprising:
    a pulse width modulator subsystem configured to generate a stream of repetitive pulse signals alternating between two controlled duty cycles at an alternating frequency corresponding to the frequency control signal;
    one of the two controlled duty cycles being controlled based on the amplitude control signal plus a design nominal duty cycle value, and summed with the offset control signal;
    the other of the controlled duty cycles being controlled based on the amplitude control signal minus the design nominal duty cycle value, and summed with the offset control signal;
    a low pass filter having an input connected to receive the stream of repetitive pulse signals from said pulse width modulator subsystem, and a low pass filter output; and
    a driver circuit connected for driving the torsion oscillator based on said low pass filter output.

6. The system of claim 5, which which further comprises a feedback controller for generating at least the amplitude and offset control signals.

7. The system of claim 5, wherein the design nominal duty cycle value corresponds to a 50% duty cycle.

8. The system of claim 5, wherein said pulse width modulator subsystem comprises:

first and second pulse width modulators configured to generate repetitive pulse signals respectively having the two controlled duty cycles at respective outputs; and a switch having an output and alternately and for equal half-periods selecting said outputs of said first and second pulse width modulators at the alternating frequency corresponding to the frequency control signal.

9. The system of claim 5, wherein said pulse width modulator subsystem includes structure operable to introduce at least one pulse width modulation cycle of 50% duty cycle when a switch is made from one of the two controlled duty cycles to the other.

10. The system of claim 5, wherein said pulse width modulator subsystem comprises:

first and second pulse width modulators configured to generate repetitive pulse signals respectively having the controlled duty cycles at respective outputs;

a first adder connected to said first pulse width modulator, said first adder generating a first duty cycle control signal based on the design nominal duty cycle value plus the amplitude control signal, and summed with the offset control signal;

a second adder connected to said second pulse width modulator, said second adder generating a second duty cycle control signal based on the design nominal duty cycle value minus the amplitude control signal, and summed with the offset control signal; and a switch having an output and alternately and for equal half-periods selecting said outputs of said first and second pulse width modulators at the alternating frequency corresponding to the frequency control signal.

11. The system of claim 5, wherein said low pass filter has a pull-to-nominal circuit configured such that, in the event said input of said low pass filter is disconnected from said pulse width modulator subsystem, said driver circuit provides substantially no drive to the torsion oscillator.

12. The system of claim 5, wherein said driver circuit comprises a voltage controlled current source.

13. The system of claim 12, wherein said driver circuit has a voltage input node and drives the torsion oscillator with a current in one direction when the voltage at said input node is above a driver reference voltage, and drives the torsion oscillator with a current in the opposite direction when the voltage at said input node is below the driver reference voltage.

14. The system of claim 13, which further comprises a gain and offset stage between said low pass filter output and said driver circuit, said gain and offset stage serving to adjust and shift the output of said low pass filter to a voltage level corresponding to said driver reference voltage when the output of said low pass filter corresponds to zero drive to the torsion oscillator.

15. The system of claim 14, wherein said low pass filter, said gain and offset stage and said driver circuit each operate from single-ended DC voltage supplies.

16. A bidirectional imaging apparatus comprising:

a light source for generating a light beam;

a torsion oscillator having a reflective surface disposed in the path of the light beam for oscillating and scanning the light beam through a scan path including an imaging window occupying a portion of the scan path, the light beam being scanned across the imaging window in a forward direction and a reverse direction;

sensors for sensing the position of the light beam in the scan path;

feedback controllers for generating frequency, amplitude and offset control signals based on signals from said sensors;

a pulse width modulator subsystem configured to generate a stream of repetitive pulse signals alternating between two controlled duty cycles at an alternating frequency corresponding to the frequency control signal;

one of the two controlled duty cycles being controlled based on the amplitude control signal plus a design nominal duty cycle value, and summed with the offset control signal;

the other of the controlled duty cycles being controlled based on the amplitude control signal minus the design nominal duty cycle value, and summed with the offset control signal;

a low pass filter having an input connected to receive the stream of repetitive pulse signals from said pulse width modulator subsystem, and a low pass filter output; and a driver circuit connected for driving the torsion oscillator based on said low pass filter output.

17. The apparatus of claim 16, wherein the design nominal duty cycle value corresponds to a 50% duty cycle.

18. The apparatus of claim 16, wherein said pulse width modulator subsystem comprises:

first and second pulse width modulators configured to generate repetitive pulse signals respectively having the two controlled duty cycles at respective outputs; and a switch having an output and alternately and for equal half-periods selecting said outputs of said first and second pulse width modulators at the alternating frequency corresponding to the frequency control signal.

19. The apparatus of claim 16, wherein said pulse width modulator subsystem includes structure operable to introduce at least one pulse width modulation cycle of 50% duty cycle when a switch is made from one of the two controlled duty cycles to the other.

20. The apparatus of claim 16, wherein said pulse width modulator subsystem comprises:

first and second pulse width modulators configured to generate repetitive pulse signals respectively having the controlled duty cycles at respective outputs;

a first adder connected to said first pulse width modulator, said first adder generating a first duty cycle control signal based on the design nominal duty cycle value plus the amplitude control signal, and summed with the offset control signal;

a second adder connected to said second pulse width modulator, said second adder generating a second duty cycle control signal based on the design nominal duty cycle value minus the amplitude control signal, and summed with the offset control signal; and a switch having an output and alternately and for equal half-periods selecting said outputs of said first and second pulse width modulators at the alternating frequency corresponding to the frequency control signal.

21. The apparatus of claim 16, wherein said low pass filter has a pull-to-nominal circuit configured such that, in the event said input of said low pass filter is disconnected from said pulse width modulator subsystem, said driver circuit provides substantially no drive to the torsion oscillator.

22. The apparatus of claim 16, wherein said driver circuit comprises a voltage controlled current source.

23. The apparatus of claim 22, wherein said driver circuit has a voltage input node and drives the torsion oscillator with a current in one direction when the voltage at said input note is above a driver reference voltage, and drives the torsion oscillator with a current in the opposite direction when the voltage at said input note is below the driver reference voltage.

24. The apparatus of claim 23, which further comprises a gain and offset stage between said low pass filter output and said driver circuit, said gain and offset stage serving to adjust and shift the output of said low pass filter to a voltage level corresponding to said driver reference voltage when the output of said low pass filter corresponds to zero drive to the torsion oscillator.

25. The system of claim 24, wherein said low pass filter, said gain and offset stage and said driver circuit each operate from single-ended DC voltage supplies.

* * * * *